Figure 1:
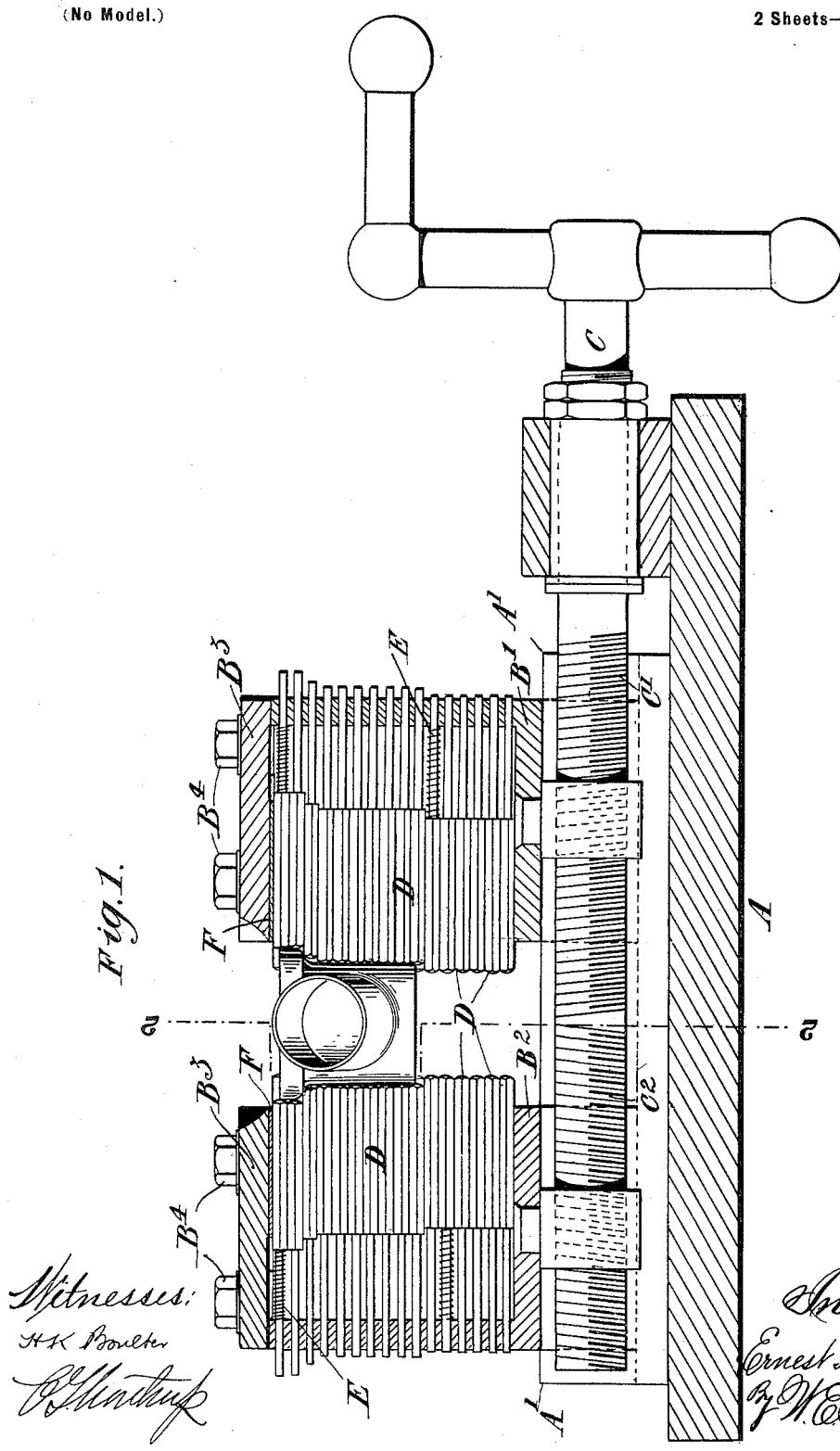

No. 626,427. Patented June 6, 1899.
E. H. JONES.
VISE.
(Application filed Dec. 8, 1898.)
(No Model.) 2 Sheets—Sheet 1.

No. 626,427. Patented June 6, 1899.
E. H. JONES.
VISE.
(Application filed Dec. 8, 1898.)
(No Model.) 2 Sheets—Sheet 2.

UNITED STATES PATENT OFFICE.

ERNEST HENRY JONES, OF LONDON, ENGLAND.

VISE.

SPECIFICATION forming part of Letters Patent No. 626,427, dated June 6, 1899.

Application filed December 8, 1898. Serial No. 698,643. (No model.)

*To all whom it may concern:*

Be it known that I, ERNEST HENRY JONES, a subject of the Queen of England, residing at London, England, have invented certain new and useful Improvements in or Relating to Vises and Similar Gripping Devices, (for which I have applied for Letters Patent in Great Britain under No. 30,513, dated December 24, 1897,) of which the following is a specification.

This invention relates to vises and similar gripping devices—such as chucks and wrenches, for instance—its object being to provide a means whereby articles of metal or other material may be easily and securely held while being at the same time set in the proper position, so that the part which it is desired to drill or otherwise work may be worked with accuracy.

Hitherto it has been a difficult matter when dealing with a number of articles of irregular shape to provide a means whereby they may be quickly set in the proper position and securely held without possibility of movement and fixed in such a manner that the drill or other tool shall operate upon exactly the same place in the case of each article of the same shape. In the case of some articles a mold has been made of the shape of the article, which mold has been separated or made in two pieces, so that the article may be fixed between them. This method has the advantage of saving time while in operation; but the objection to it is that a separate and costly mold has to be made for each article, and it is further a very difficult matter to so make the mold that it shall present precisely the part to the tool which it is desired to work.

By the present invention I make use of the advantages of the mold, while removing its disadvantages, and I make a vise which I can readily adjust to the shape of the article to be held and which, in effect, is a divided or sectional mold with movable surfaces readily adjustable to fit any form of article placed between them and having means whereby rods or the like the ends of which make up each mold-surface may be retained securely in the positions to which they are adjusted. This may be accomplished by providing a number of rods or pins on the face of each of two or more carriers, movable toward or away from each other, these rods being adjustable endwise individually in relation to the carriers by which they are supported.

In practice the article is placed between two jaws provided with adjustable projections, (or between a single jaw thus provided and a plain jaw,) and the jaws are moved together, so that the article displaces the projections opposite to it and their ends bear on the different portions of its form and hold it up approximately as a mold would do. The projections are then clamped securely in the positions to which they have adjusted themselves and the jaw is tightened upon the article by the vise-screw. If the article afterward be removed from between the projections and another of the same shape inserted, it will take precisely the same position as the previous article, and, for example, if a hole is required to be drilled in the article and the vise is fixed in position beneath the drill then the hole will be drilled in exactly the same position in each article.

Figure 2:
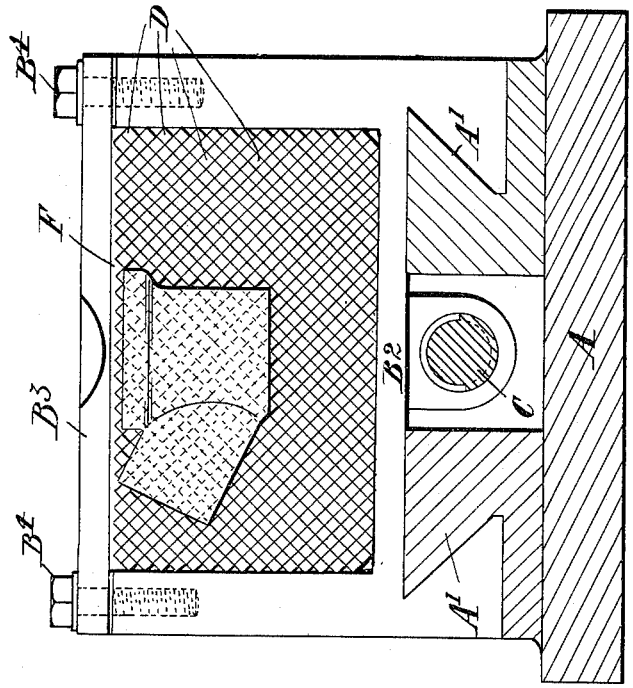

In the accompanying drawings, Figure 1 is a longitudinal section, and Fig. 2 a transverse section, of an improved vise constructed according to this invention.

Like letters indicate like parts throughout the drawings.

Upon the body A of the vise two carriers B' B² slide in guides A'. They are caused to approach each other or to recede from one another by a screw C, journaled in the body A, so as to have no endwise movement, and provided with a right-handed thread C', engaging with the carrier B', and with a left-handed thread C², engaging with the carrier B².

The carriers B' and B² are in the present instance duplicates of each other, so that the following description of the carrier B' will serve also as that of the companion carrier B². From the face of the carrier protrude a number or rods D, of rectangular cross-section, placed close together in contact with each other, the lowest angle of the cross-section of each rod, Fig. 2, extending between adjacent rods. The inner end of each rod is reduced and encircled by a spiral spring E, bearing at one end upon the back of the carrier and at the other end upon the shoulder formed at the place at which the reduced end of the rod joins the larger protruding body portion. If desired, the springs E may be dispensed with altogether. Above the series of rods is a top clamping or pressure plate B³, retained in place by screws B⁴, by means of which latter it can be forced down upon the series of rods below it to cause them to be gripped between it and the walls of the carrier after the rods have adjusted themselves endwise to the outline of an article, as described, to enable the pressure of the top plate to be well distributed over the series of rods. A cushion F of comparatively soft material—say of leather or lead—is interposed between it and the upper row.

By having the angles of the rods or projections D enter between the sides of adjacent rods the pressure exerted upon the clamping or pressure plate B³ can be caused to exert a wedging action upon each rod, displacing it laterally and causing the whole series to fit tightly into the containing-carrier.

The springs E are of such a length that when not compressed they will cause all the rods D to protrude equally to the desired extent from the face of the carrier, permitting each rod to recede automatically to the desired extent when the carrier is moved up toward an article of irregular form.

The invention is not limited to the particular arrangement of rods shown or to the described clamping device for the series, its essentials being the use of a series of rods individually adjustable endwise and retainable in the positions to which they are adjusted by any convenient retaining device.

I claim—

In a vise, the combination with a supporting-body, and guides thereon, of a carrier arranged to slide upon the guides and provided with a threaded opening; a threaded adjusting-rod supported upon the body and threaded within the opening of the carrier and adapted to adjust said carrier longitudinally, a second carrier arranged in line with the first carrier, a series of rods rectangular in cross-section arranged longitudinally within each of the carriers and in contact with each other and longitudinally adjustable independently of each other as described, the lowest angle of the cross-section of each rod extending between adjacent rods, a spring arranged to bear upon each of the rods and operating to normally force the rods of one carrier toward those of the other carrier, a clamping-plate arranged to bear upon the uppermost rods of each of the carriers, means for clamping the plates against the rods with a pressure sufficient to hold the rods in adjusted position, and a cushion of comparatively soft material interposed between each of the clamping-plates and the rods beneath them, for the purpose set forth.

In witness whereof I hereto set my hand in the presence of two subscribing witnesses.

ERNEST HENRY JONES.

Witnesses:
HARRY B. BRIDGES,
WM. JNO. TENNANT.